US009544551B2

(12) United States Patent
Locke et al.

(10) Patent No.: US 9,544,551 B2
(45) **Date of Patent: *Jan. 10, 2017**

(54) STORE INTELLIGENCE PLATFORM USING PROXIMITY SENSING

(71) Applicants: Robert B. Locke, Sonoma, CA (US); Hubert A. Patterson, Boca Raton, FL (US)

(72) Inventors: Robert B. Locke, Sonoma, CA (US); Hubert A. Patterson, Boca Raton, FL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 204 days.

This patent is subject to a terminal disclaimer.

(21) Appl. No.: 14/499,695

(22) Filed: Sep. 29, 2014

(65) Prior Publication Data

US 2016/0093184 A1 Mar. 31, 2016

(51) Int. Cl.
*H04N 7/18* (2006.01)
*G08B 13/24* (2006.01)
(Continued)

(52) U.S. Cl.
CPC ................ *H04N 7/183* (2013.01); *G07C 9/00* (2013.01); *G08B 13/248* (2013.01);
(Continued)

(58) Field of Classification Search
CPC . G08B 13/196; G08B 13/2451; G08B 13/248; H04N 7/183; H04W 4/008; H04W 4/021
(Continued)

(56) References Cited

U.S. PATENT DOCUMENTS 8,816,854 B2 * 8/2014 Bergman ............. G08B 29/046 235/383
2006/0267770 A1 11/2006 Sanari et al.
(Continued)

FOREIGN PATENT DOCUMENTS

EP 1632919 A2 3/2006
WO 2004034347 A1 4/2004
(Continued)

OTHER PUBLICATIONS

"Getting Started with iBeacon," Jun. 2, 2014, XP055144837, Retrieved from Internet on Oct. 17, 2014 by European Patent Office, URL: https://developer.apple.com/ibeacon/Getting-Started-with-iBeacon.pdf.

*Primary Examiner* — Thai Tran
*Assistant Examiner* — Stephen Smith
(74) *Attorney, Agent, or Firm* — Fox Rothschild LLP; Robert J. Sacco; Carol E. Thorstad-Forsyth

(57) ABSTRACT

Systems (100) and methods (400-1000) for providing store intelligence. The methods involve: communicating a First Unique IDentifier ("FUID") between a beacon of a Proximity System ("PS") disposed adjacent to an EAS system of a facility and a Mobile Communication Device ("MCD") possessed by a person; communicating FUID and a Second UID ("SUID") to an Intelligence System ("IS"), where FUID and SUID collectively comprise a UID of the beacon and a UID of the MCD; capturing a Time Stamped Image ("TSI") of the person using a camera of the proximity system; communicating TSI to IS for storage; and performing operations at IS to enhance the security/safety of the facility by using FUID to detect an entrance/exit of the person to/from the facility and at least one of SUID and TSI to make a first determination as to an identification of the person.

16 Claims, 12 Drawing Sheets

Corporate Facility 170
Store Intelligence System 140
Network (e.g., Internet) 136
System 100
Retail Store Facility 160
Display Equipment 104
Proximity System 106
Camera 136
Beacon 138
Article 150
Electronic Article Surveillance ("EAS") System 120
Security Tag 122
Monitoring System 124
Proximity Sensors 130
Proximity System 116
Communication Device 114
Emergency Equipment (e.g., smoke detectors and exit signs) 132
Proximity System 134
Mobile Communication Device 110
Person 108

(51) Int. Cl.
*H04W 4/00* (2009.01)
*H04W 4/02* (2009.01)
*G07C 9/00* (2006.01)

(52) U.S. Cl.
CPC ........ *G08B 13/2482* (2013.01); *H04W 4/008* (2013.01); *H04W 4/021* (2013.01)

(58) Field of Classification Search
USPC ......... 348/143, 150, 152–156, 159; 340/540, 340/573.1; 455/404.2; 703/13
See application file for complete search history.

(56) References Cited

U.S. PATENT DOCUMENTS

2007/0252001 A1 11/2007 Kail et al.
2008/0284593 A1 11/2008 Soto et al.
2009/0322521 A1* 12/2009 Jacobson .............. H04L 63/102 340/540
2010/0070785 A1 3/2010 Fallin et al.
2010/0176947 A1 7/2010 Hall
2010/0238286 A1 9/2010 Boghossian et al.
2012/0112918 A1 5/2012 Dinh et al.
2012/0282974 A1* 11/2012 Green .............. G08B 13/19689 455/550.1
2012/0307051 A1* 12/2012 Welter ............... G08B 13/2482 348/143
2014/0019241 A1* 1/2014 Treiser ............... G06Q 30/0609 705/14.53
2014/0214499 A1* 7/2014 Hudson ................. G07F 17/246 705/13
2014/0214500 A1* 7/2014 Hudson .............. G06Q 30/0284 705/13
2015/0073980 A1* 3/2015 Griffin .................. H04W 4/008 705/39
2015/0350848 A1* 12/2015 Eramian ................. H04W 4/04 455/404.2
2016/0042357 A1* 2/2016 Ho ................... G06Q 20/40145 705/13
2016/0073010 A1* 3/2016 Cronin ................... G06Q 10/00 705/39

FOREIGN PATENT DOCUMENTS

WO 2012/166211 12/2012
WO 2012166211 A1 12/2012
WO 2014145270 A1 9/2014
WO WO 2014145270 A1 * 9/2014 ............. G07B 15/02

* cited by examiner

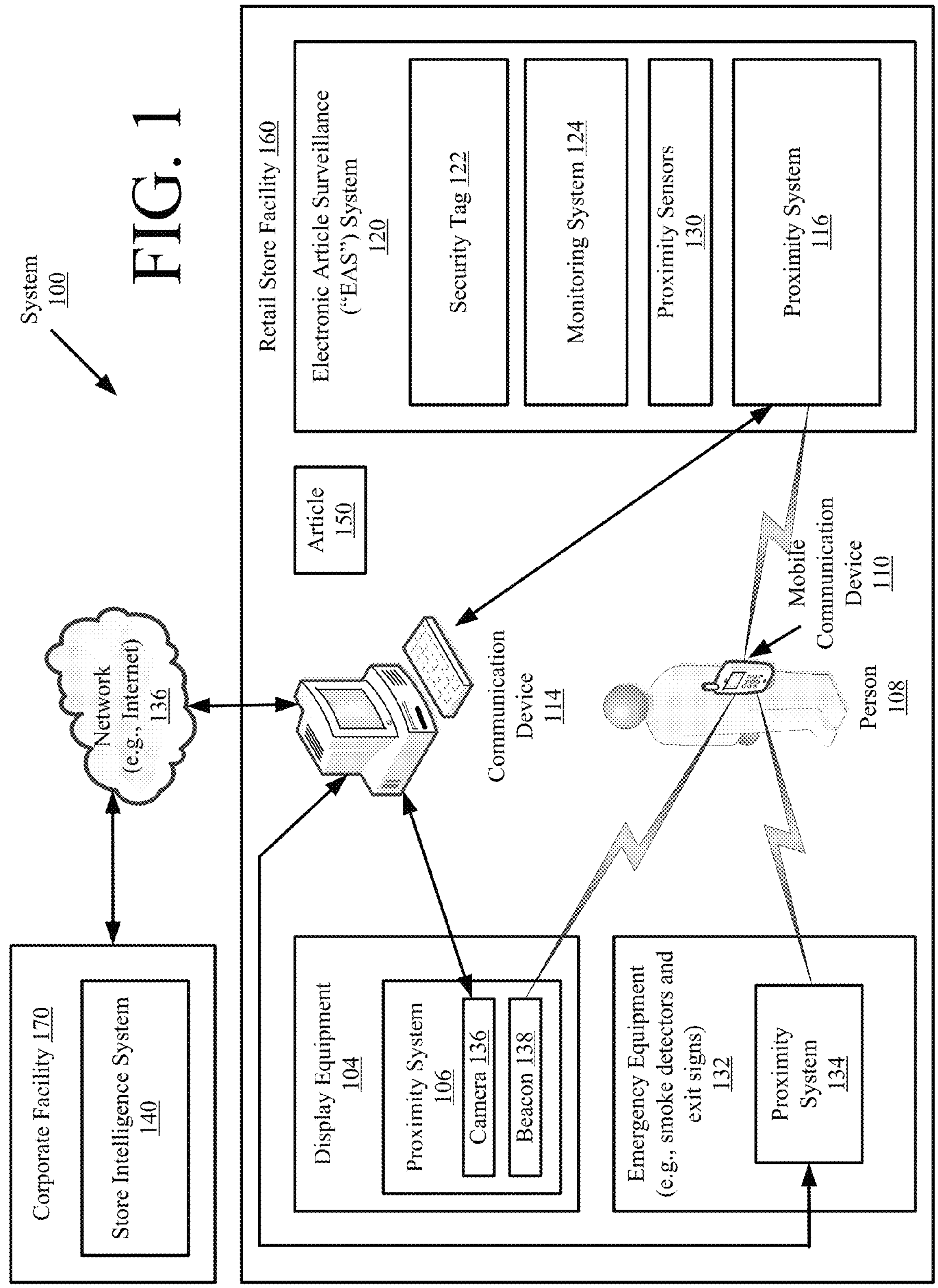
System 100
FIG. 1
Corporate Facility 170
Store Intelligence System 140
Network (e.g., Internet) 136
Retail Store Facility 160
Electronic Article Surveillance ("EAS") System 120
Security Tag 122
Monitoring System 124
Proximity Sensors 130
Proximity System 116
Article 150
Communication Device 114
Mobile Communication Device 110
Person 108
Display Equipment 104
Proximity System 106
Camera 136
Beacon 138
Emergency Equipment (e.g., smoke detectors and exit signs) 132
Proximity System 134

STORE INTELLIGENCE PLATFORM USING PROXIMITY SENSING

FIELD OF THE INVENTION

This document relates generally to indoor proximity systems for retail applications. More particularly, this document relates to store intelligence platforms using indoor proximity systems.

BACKGROUND OF THE INVENTION

Indoor proximity systems are well known in the art. One conventional indoor proximity system is known as iBeacon®. iBeacon® employs Bluetooth communication technology to connect to mobile communication devices (e.g., cellular phones). Upon establishment of such connection, the iBeacon® requests and receives first information from each mobile communication device. The first information includes information which has been agreed upon by the cell user for provision to the iBeacon®. The iBeacon® can also push second information to the mobile communication device. The second information can include, but is not limited to, coupon related information which has been selected based on the store a customer is presently in or entering into. The Bluetooth technology is based on a 2.45 GHz transmission, and its data rate ranges from 1 Mbit to 24 Mbit.

SUMMARY OF THE INVENTION

The present invention concerns implementing systems and methods for providing store intelligence. The methods comprise communicating a first unique identifier between a first beacon of a first proximity system disposed adjacent to an Electronic Article Surveillance ("EAS") system of a facility and a Mobile Communication Device ("MCD") possessed by a person located in proximity to the first beacon via a first Short Range Communication ("SRC"). This communication of the first unique identifier may be performed in response to a detection of when the person moves in proximity to the first beacon. The first unique identifier and a second unique identifier are then communicated to an intelligence system located remote from the first beacon and the MCD. The first and second unique identifiers collectively comprise a unique identifier of the first beacon and a unique identifier of the MCD.

A first time stamped image of the person is also captured using a camera of the proximity system which is located near the first beacon. The first time stamped image is sent to the intelligence system for storage. The capturing of the first time stamped image is triggered because (1) a people counter in or near a pedestal of the EAS system is activated or (2) a proximity sensor detects the presence of the person in proximity to the pedestal.

At the intelligence system, operations are performed to enhance the security or safety of the facility. In this regard, the intelligence system uses: (1) the first unique identifier to detect an entrance or exit of the person to/from the facility; (2) at least one of the second unique identifier and the first time stamped image to make a first determination as to an identification of the person; and/or (3) uses at least the first time stamped image to make a second determination as to whether or not the person possibly stole an article from the facility or another facility on a previous occasion.

The second determination can be made by comparing the first time stamped image to a plurality of second time stamped images captured as people exited the facility during a previous period of time when a theft actually or is thought to have occurred. When it is determined that the person possibly stole the article from the facility or another facility on a previous occasion, the intelligence system can perform operations to (a) notify security personnel and/or (b) provide the first time stamped image to the security personnel. In contrast, when it is determined that the person did not steal the article from the facility or another facility on a previous occasion with a specified degree of confidence, the proximity system can perform operations to inhibit an issuance of an alarm upon the person's exit from the facility.

In some scenarios, the person may comprise an active security tag at the time (s)he enters the facility. Accordingly, an alarm is issued when the person enters the facility and moves into an interrogation zone of the EAS system. The proximity system can also inhibit issuance of the alarm at this time.

In those or other scenarios, the methods further involve communicating the second unique identifier or a third unique identifier between a second beacon of a second proximity system disposed adjacent to emergency equipment of the facility and the MCD possessed by the person located in proximity to the second beacon via a second SRC. The second unique identifier and the third unique identifier are then communicated to the intelligence system. The second and third unique identifiers collectively comprise a unique identifier of the second beacon and the unique identifier of the MCD. At least the second and third unique identifiers are used by the intelligence system to provide information specifying at least a current location of the person within the facility to emergency personnel.

DESCRIPTION OF THE DRAWINGS

Embodiments will be described with reference to the following drawing figures, in which like numerals represent like items throughout the figures, and in which:

FIG. 1 is a perspective view of an exemplary system that is useful for understanding the present invention.

DETAILED DESCRIPTION OF THE INVENTION

Figure 2:
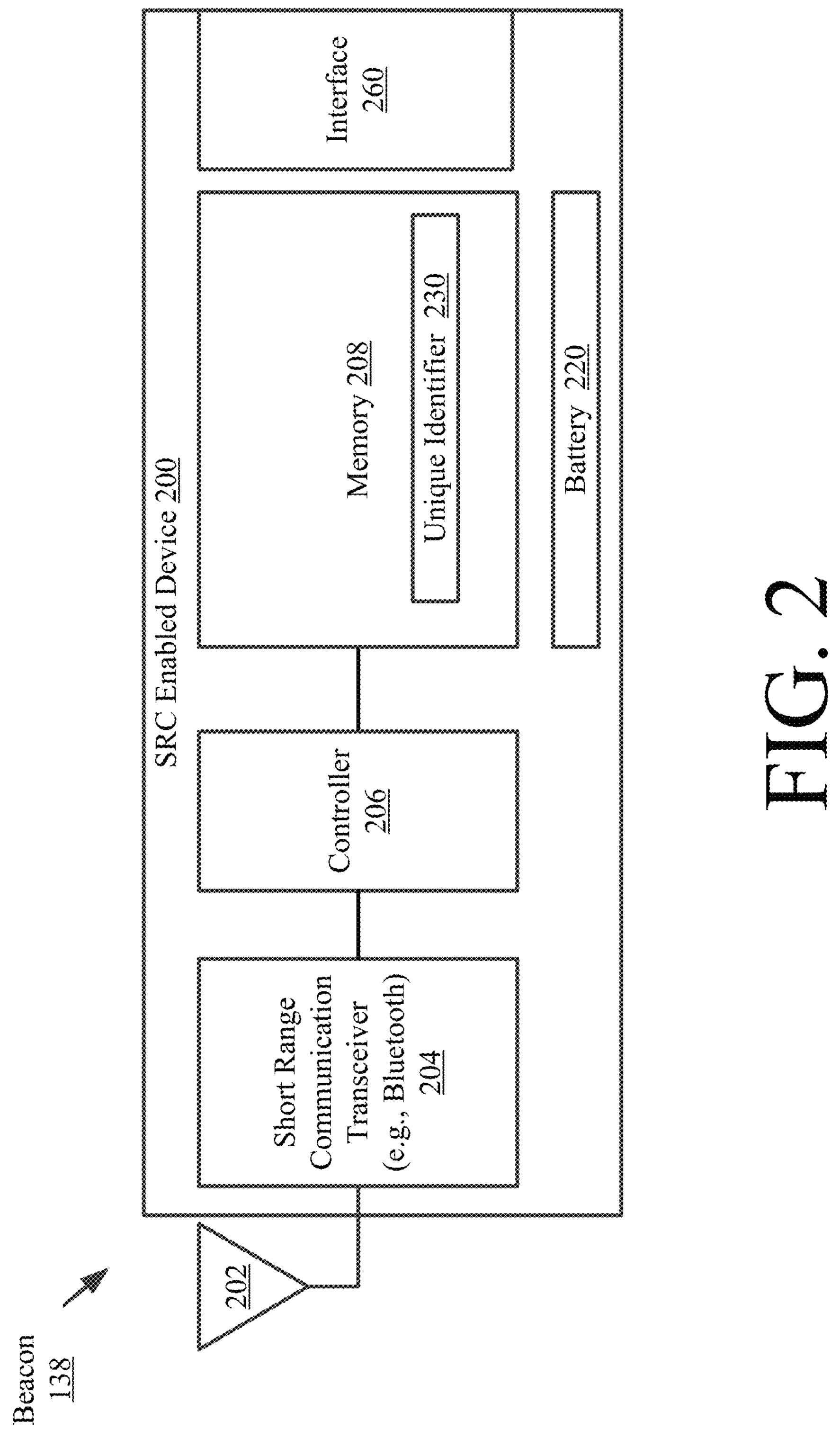
FIG. 2 is a block diagram of an exemplary architecture for a beacon shown in FIG. 1.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Embodiments of the present invention will now be described with respect to FIGS. 1-10. The present invention generally relates to novel systems and methods for providing a store intelligence system using proximity systems (e.g., an iBeacon® based proximity system). The methods generally involve: communicating a first unique identifier between a first beacon of a first proximity system disposed adjacent to an EAS system of a facility and an MCD possessed by a person located in proximity to the first beacon via a first SRC. The first unique identifier and a second unique identifier are then communicated to an intelligence system located remote from the first beacon and the MCD. The first and second unique identifiers collectively comprise a unique identifier of the first beacon and a unique identifier of the MCD. A first time stamped image of the person is also captured using a camera of the proximity system which is located near the first beacon. The first time stamped image is sent to the intelligence system for storage. At the intelligence system, operations are performed to enhance the security or safety of the facility. In this regard, the intelligence system uses: (1) the first unique identifier to detect an entrance or exit of the person to/from the facility; (2) at least one of the second unique identifier and the first time stamped image to make a first determination as to an identification of the person; and/or (3) uses at least the first time stamped image to make a second determination as to whether or not the person possibly stole an article from the facility or another facility on a previous occasion. Based on the results of the first and/or second determinations, various operations can be performed by the inelegance system and/or proximity system. For example, the proximity system can perform operations to inhibit an issuance of an alarm upon the person's entry and/or exit from the facility. Such alarm issuance inhibition upon the person's exit may occur when it is determined that the person did not steal the article from the facility or another facility on a previous occasion with a specified degree of confidence.

Referring now to FIG. 1, there is provided a schematic illustration of an exemplary system 100 that is useful for understanding the present invention. The system 100 is generally configured to allow improved retail store intelligence and customer service using wireless communication technology. The wireless communication technology can include, but is not limited to, Short Range Communication ("SRC") technology and/or mobile communication technology. The SRC technology includes, but is not limited to, Bluetooth technology. The mobile communication technology can include, but is not limited to, Radio Frequency ("RF") communication technology.

As shown in FIG. 1, system 100 comprises a Retail Store Facility ("RSF") 160 and a Corporate Facility ("CF") 170 which are communicatively coupled to each other via a network (e.g., the Internet) 136. Although FIG. 1 is shown as having two facilities, the present invention is not limited in this regard. For example, the facilities 160, 170 can reside in the same or different building or geographic area. Alternatively or additionally, the facilities 160, 170 can be the same or different sub-parts of a larger facility.

The RSF 160 is generally configured to provide enhanced security and store intelligence. In this regard, the RSF 160 comprises a plurality of proximity systems 106, 116, 134 disposed at various strategic locations therein. For example, a first proximity system 106 is coupled to display equipment (e.g., a promotional display or an article display cabinet). A second proximity system 116 is disposed on or in an Electronic Article Surveillance ("EAS") system 120. In this case, the second proximity system 116 may be disposed on at least one pedestal located at an exit/entry point of the RSF 160. A third proximity system 134 is disposed in or on emergency equipment (e.g., a smoke detector, an exit sign or an emergency door).

Each proximity system 106, 116, 134 comprises a beacon 138 and/or a camera 136. The beacon 138 is generally operative to communicate information to and/or from other communication devices via SRC technology (e.g., Bluetooth technology). Therefore in some scenarios, the beacon 138 comprises an iBeacon®. iBeacons® are well known in the art, and therefore will not be described in detail herein. Still, it should be understood that the iBeacon® can be used as a transmit device or as a receive device using Bluetooth technology. The camera 136 is used to obtain time stamped images of people entering, present within, and/or exiting the RSF 160. The present invention is not limited to cameras as devices for obtaining information relating to characteristics (e.g., facial images) of people. Any other biometric device could also be employed which facilitate identification of a person.

The information communicated from the beacon 138 can include, but is not limited to, a unique identifier therefore. The unique identifier of the beacon 138 provides a means to determine the location of a person within the RSF 160. For example, let's assume that a person 108 located in the RSF 160 is in possession of a Mobile Communication Device ("MCD") 110 having an SRC application installed thereon. When the person 108 moves into proximity of the beacon 138, the beacon communicates its unique identifier to the MCD 110 via an SRC communication. Also, the camera 136 captures at least one time stamped image of the person 108, and forwards the captured image to a Store Intelligence System ("SIS") 140 of the CF 170 directly (not shown in FIG. 1) or indirectly via a computing device 114. The MCD 110 sends the unique identifier of the beacon 138 and its own unique identifier (e.g., MAC address) to the SIS 140.

Notably, the SIS 140 does not need to be remote from the retail store facility 160 in all situations. For example, if the retail store facility is part of relatively small store chain, then the SIS might be located in one of the retail stores. The SIS could also be a cloud function as well. In this case, the SIS might not be located in the corporate facility 170, but rather in a server rented from a cloud provider.

At the SIS 140, various operations are performed using the two unique identifiers and/or the time stamped image. For example, the two unique identifiers and/or time stamped image are used to (1) increase the security and safety of the RSF 160, (2) provide promotional materials to the person, (3) provide lock codes to the person for accessing a particular area of the RSF 160 and/or articles stored in a locked display, (4) track peoples paths of travel through the retail store, (5) generate a map indicating where one or more persons are located within the RSF 160, and/or (6) improve the shopping and/or check-out experience of a customer.

As noted above, the RSF 160 comprises an EAS system 120. The EAS system 120 includes a monitoring system 124 and at least one security tag 122. Although not shown in FIG. 1, the security tag 122 is attached to an article 150 for protecting the article 150 from an unauthorized removal from the RSF 160. The monitoring system 124 establishes a surveillance zone (not shown) within which the presence of the security tag 122 can be detected. The surveillance zone is established at an access point (not shown) for the RSF 160. If the security tag 122 is carried into the surveillance zone, then an alarm is triggered to indicate a possible unauthorized removal of the article 150 from the RSF 160.

During store hours, a customer may desire to purchase the article 150. The customer can purchase the article 150 via a fixed POS station (e.g., a checkout counter) or a mobile POS station (e.g., MCD 110). Once the article 150 has been successfully purchased, the security tag 122 is disabled and/or detached from the article 150. In effect, an alarm is not issued when the customer passes through the interrogation zone.

In some cases, a person may attempt to steal the article 150, and thus leave the RSF 160 with the article 150 having an activated security tag 122 coupled thereto or a maliciously deactivated secure tag 122 coupled thereto. When the person walks through the interrogation zone of the EAS system 120, an alarm may issue as discussed above. However, the person may not be stopped if a number of other people (e.g., 5) pass through the interrogation zone at the same or substantially the same time. Still, each time a person passes through the interrogation zone a beacon of the proximity system 116 causes its unique identifier and a unique identifier of the MCD carried by the person to be communicated to the SIS 140. Additionally, the camera of the proximity system 116 is triggered to capture a time stamped image of the person and forward the same to the SIS 140 for storage and facial recognition analysis. As such, a database of MCD unique identifiers and time stamped images is obtained that is useful for detecting repeat offenders and/or suspicious thieves as they enter the RSF 160 at a later time.

The facial recognition analysis may be pared with various services that scan social media sites (e.g., Facebook®), police records and other sources to tie a name with the face represented in the captured image. The image trigger may occur because (1) a people counter in or near a pedestal of the EAS system is activated, and/or (2) a proximity sensor 130 detects the presence of a person in proximity to the pedestal. The proximity sensor 130 can include, but is not limited to, an acoustic sensor or a light based sensor.

The proximity system 116 also allows the RSF 160 to monitor customers traveling into the RSF 160, and detect which ones are carrying active security tags. In this case, the proximity system 116 is tied to the pedestal's alarm circuit. If a command is generated to issue an alarm when a person enters the RSF 160, then the proximity system 116 may inhibit such alarm issuance. Also, a facial recognition process may be performed by the proximity system 116 and the SIS 140 to determine whether or not the person has possibly stolen an article from the RSF or another RSF of the same company on one or more previous occasions. Such a determination is made by comparing a currently captured image of the person to a plurality of previously captured images of people exiting the RSF during a period of time when a theft actually and/or was thought to have occurred. If it is determined that the person has possibly previously stolen an article from the company, then certain remedial actions can be taken, such as notifying store personnel of the person's entrance into the RSF along with other information related to the person. The store personnel can be provided the most recent captured image of the person. In contrast, if it is determined that the person did not steel the given article from the company with a relatively high degree of confidence, then issuance of an alarm upon the person's exiting of the RSF 160 could also be inhibited.

The proximity system 116 further allows the RSF 160 to detect which people entering the RSF 160 are preferred customers. The presence of a preferred customer is noted in the system, and certain actions can take place to improve the preferred customer's shopping experience. For example, certain functions of the retail application installed on the MCD are initiated. Such functions can include, but are not limited to, self-checkout functions, coupon related functions and promotional related functions. Also, store personnel can be notified of the preferred customer's presence in the RSF such that the store personnel can perform actions for improving the preferred customer's shopping experience.

As noted above, a proximity system 132 is also disposed in emergency equipment 132. The emergency equipment can include, but is not limited to, emergency doors, smoke detectors and exit signs. This proximity system 132 facilitates the tracking of people's paths of travel through the retail store and the generation of a map indicating where one or more persons are located within the RSF 160 at any given time. Such operations improve the overall safety of the RSF 160 during emergency situations (e.g., fires). For example, let's assume that a fire exists in the RSF 160. The generated map can be provided and used by emergency response personnel to more efficiently remove all persons from the RSF with a reduced risk of injury thereto.

Notably, the other proximity system 104 and 116 can also be used in conjunction with proximity system 132 to facilitate improved safety of the RSF 160. Also, the map can also be used to obtain an understanding of typical traffic patterns of one or all customers who enter the RSF 160. This understanding can be used to re-organize the RSF 160 or push select promotional materials to customers so as to maximize their awareness of products offered for sale within the RSF 160.

As also noted above, a proximity system 106 is disposed in display equipment 104. The display equipment 104 can include, but is not limited to, promotional displays, equipment securing areas of the RSF and secure display cabinets. In this case, the proximity system 106 facilitates the selected provision of coupons and other promotional materials to customers located in the RSF 160. For example, let's assume that the proximity system 106 is disposed in a promotional display located in an aisle of the RSF 160. When a person moves into proximity of the beacon of the proximity system 106, information is exchanged between an MCD of the person and the beacon. If the information is sent from the MCD to the beacon, then the information comprises a unique identifier of the MCD. In contrast, if the information is sent from the beacon to the MCD, then the information comprises a unique identifier of the beacon. In both cases, the unique identifiers of the MCD and beacon are forwarded to the SIS 140. At the SIS 140, the unique identifiers are used to selectively obtain promotional material from a plurality of pre-stored promotional material. The selected promotional material is then provided from the SIS to the MCD, where it is displayed to the person.

The proximity system 106 also facilitates access control to secured articles or other items by customers and/or store personnel. For example, let's assume that the proximity system 106 is disposed on a door with a lock (e.g., a door to a locked display cabinet or a door to a locked room). When a person moves in proximity of the proximity system 106, information is exchanged between an MCD of the person and the beacon. If the information is sent from the MCD to the beacon, then the information comprises a unique identifier of the MCD. In contrast, if the information is sent from the beacon to the MCD, then the information comprises a unique identifier of the beacon. In both cases, the unique identifiers of the MCD and beacon are forwarded to the SIS 140. The SIS 140 then uses the received information (i.e., the unique identifiers and/or optionally captured image) to determine if the person is authorized to obtain access to the secured area. If not, the SIS 140 may notify security personnel of the unauthorized attempted access to the secure area. Is so, the SIS 140 may obtain a security code to unlock the lock, and provide the same to the MCD of the person. Also, the SIS 140 may command the camera of the proximity system 106 to capture a time stamped image of the person, and forward the same to the SIS 140. The security code could be static or variable (i.e., is different for each use). In the static scenario, the security code could be automatically removed from the MCD upon the expiration of a given time period (e.g., 1 minute). Upon access to the secure area, the person may take an article or item therefrom. The article or item can be one that is for sale to a customer or a tool used for job performance by store personnel. The tool may be required to be returned upon completion of a particular job or at the end of a work day. The time-stamped image captured by the camera of the proximity system 106 can be used to identify a person who did not return the tool to the secured area at the specified time. The identified person can then be notified via his(her) MCD that the tool needs to be returned as soon as possible.

Although not shown in FIG. 1, a proximity system can be located at a check-out lane kiosk or other device to facilitate a decrease in check-out time and/or improve ease of customer check-out. For example, let's assume that a person is attempting to check-out by purchasing at least one article 150. When the person moves in proximity to the check-out lane kiosk, information is exchanged between an MCD of the person and the beacon of the proximity system. If the information is sent from the MCD to the beacon, then the information comprises a unique identifier of the MCD. In contrast, if the information is sent from the beacon to the MCD, then the information comprises a unique identifier of the beacon. In both cases, the unique identifiers of the MCD and beacon are forwarded to the SIS 140. The SIS 140 uses the received information to (1) identify the customer, (2) obtain pre-stored payment information for the customer (e.g., credit card information), (3) obtain information specifying the travel path of the person through the RSF 160, and/or (4) correlating the travel path information with the checkout information. The travel path information may be an indication that the person has trouble finding an item (e.g., wandering path around a certain aisle) or could be an indication of theft if the customer went directly to a shelf and removed a large number of a single item.

Referring now to FIG. 2, there is provided a schematic illustration of an exemplary architecture for beacon 138 of FIG. 1. Beacon 138 can include more or less components than that shown in FIG. 2. However, the components shown are sufficient to disclose an illustrative embodiment implementing the present invention. Some or all of the components of the beacon 138 can be implemented in hardware, software and/or a combination of hardware and software. The hardware includes, but is not limited to, one or more electronic circuits. The electronic circuit may comprise passive components (e.g., capacitors and resistors) and active components (e.g., processors) arranged and/or programmed to implement the methods disclosed herein.

The hardware architecture of FIG. 2 represents an embodiment of a representative beacon 138 configured to facilitate improved store intelligence. In this regard, the beacon 138 comprises an SRC enabled device 200 for allowing data to be exchanged with an external device (e.g., MCD 110 of FIG. 1) via SRC technology (e.g., Bluetooth technology). The components 204-208, 260 and a battery 220 shown in FIG. 2 may be collectively referred to herein as the SRC enabled device 200.

The SRC enabled device 200 comprises an antenna 202 for allowing data to be exchanged with the external device via SRC technology. The antenna 202 is configured to receive SRC signals from the external device and/or transmit SRC signals generated by the SRC enabled device 200. The SRC enabled device 200 comprises an SRC transceiver 204. SRC transceivers are well known in the art, and therefore will not be described herein. However, it should be understood that the SRC transceiver 204 transmits SRC signals including first information to the external device, and processes received SRC signals to extract second information therefrom. The first information includes a unique identifier 230 of the beacon 138. The unique identifier 230 provides a means for an SIS to determine the location of a person located within a given facility (e.g., RSF 160 of FIG. 1). The second information can include, but is not limited to, a unique identifier of an external device (e.g., MCD 110 of FIG. 1). The SRC transceiver 204 may pass the extracted second information to the controller 206 via interface 260.

At the controller 206, the information may be pre-processed to determine how the SRC signal is to be handled by the beacon 138. For example, the unique identifier of the external device and the unique identifier of the beacon may be forwarded to an SIS for various purposes, such as security purposes, client services purposes, access control purposes, and/or promotional purposes.

Notably, the memory 208 may be a volatile memory and/or a non-volatile memory. For example, the memory 208 can include, but is not limited to, a Random Access Memory ("RAM"), a Dynamic Random Access Memory ("DRAM"), a Static Random Access Memory ("SRAM"), a Read-Only Memory ("ROM") and a flash memory. The memory 208 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

Figure 3:
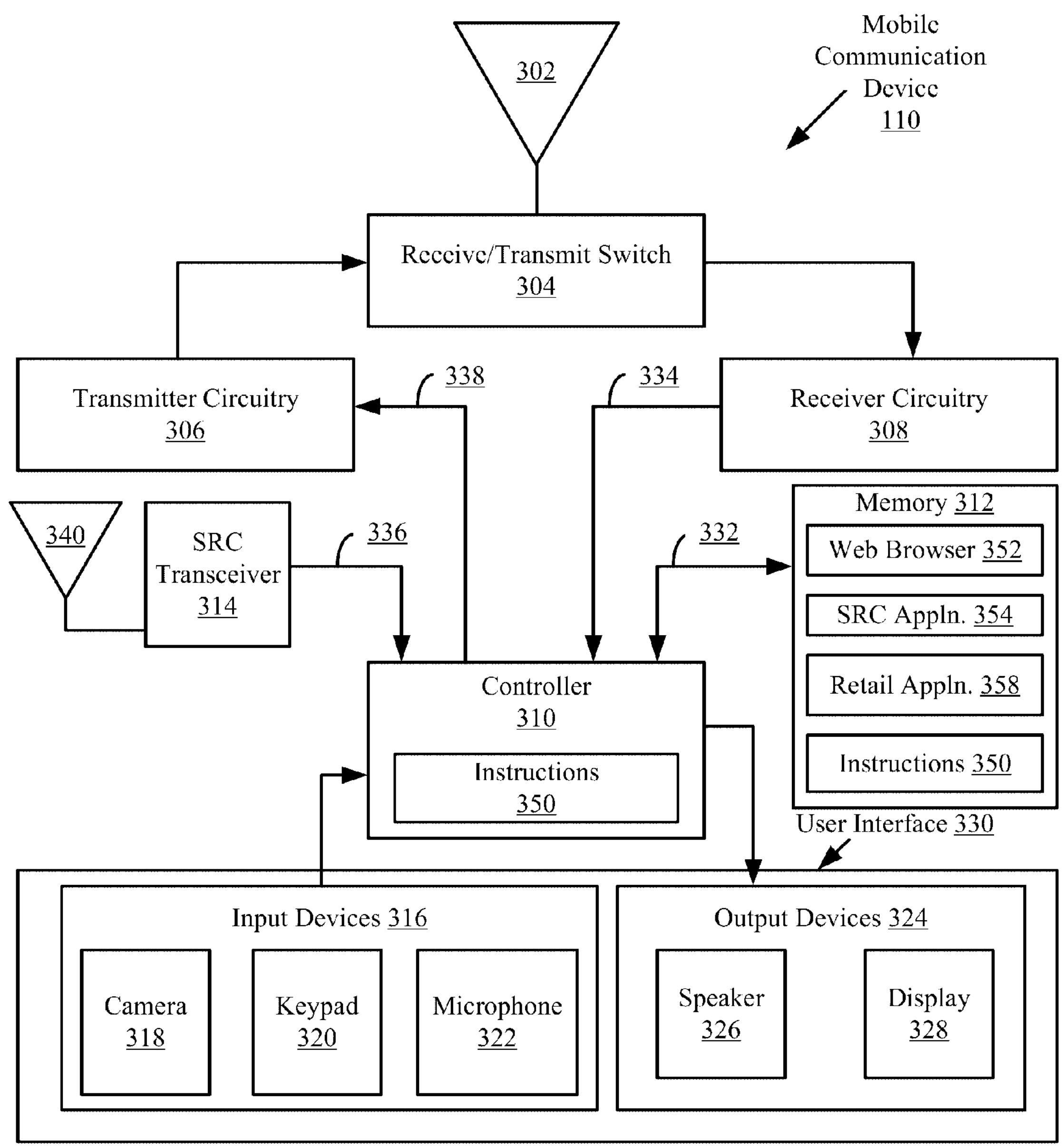
FIG. 3 is a block diagram of an exemplary architecture for a mobile communication device shown in FIG. 1.

Referring now to FIG. 3, there is provided a block diagram of an exemplary architecture for MCD 110 that is useful for understanding the present invention. MCD 110 may include more or less components than those shown in FIG. 3. However, the components shown are sufficient to disclose an illustrative embodiment implementing the present invention. Some or all of the components of the MCD 110 can be implemented in hardware, software and/or a combination of hardware and software. The hardware includes, but is not limited to, one or more electronic circuits.

MCD 110 can include, but is not limited to, a notebook computer, a personal digital assistant, a cellular phone or a mobile phone with smart device functionality (e.g., a Smartphone). In this regard, the MCD 110 comprises an antenna 302 for receiving and transmitting RF signals. A receive/transmit ("Rx/Tx") switch 304 selectively couples the antenna 302 to the transmitter circuitry 306 and the receiver circuitry 308 in a manner familiar to those skilled in the art. The receiver circuitry 308 demodulates and decodes the RF signals received from an external device. The receiver circuitry 308 is coupled to a controller (or microprocessor) 310 via an electrical connection 334. The receiver circuitry 308 provides the decoded signal information to the controller 310. The controller 310 uses the decoded RF signal information in accordance with the function(s) of the MCD 110. The controller 310 also provides information to the transmitter circuitry 306 for encoding and modulating information into RF signals. Accordingly, the controller 210 is coupled to the transmitter circuitry 306 via an electrical connection 338. The transmitter circuitry 306 communicates the RF signals to the antenna 302 for transmission to an external device via the Rx/Tx switch 304.

MCD 110 also comprises an antenna 340 coupled to an SRC transceiver 314 for receiving SRC signals. SRC transceivers are well known in the art, and therefore will not be described in detail herein. However, it should be understood that the SRC transceiver 314 processes the SRC signals to extract information therefrom. The SRC transceiver 314 may process the SRC signals in a manner defined by the SRC application 354 installed on the MCD 110. The SRC application 354 can include, but is not limited to, a Commercial Off the Shelf ("COTS") application. The SRC transceiver 314 is coupled to the controller 310 via an electrical connection 336. The controller uses the extracted information in accordance with the function(s) of the MCD 110. For example, the extracted information can be forwarded by the MCD 102 to an SIS (e.g., SIS 140 of FIG. 1) where it can be used for various purposes. Such purposes can include, but are not limited to: (1) increasing the security of the RSF 160, (2) providing promotional materials to the person, (3) providing lock codes to the person for accessing a particular area of the RSF 160 and/or articles stored in a locked display, (4) tracking peoples paths of travel through the retail store, (5) generating a map indicating where one or more persons are located within the RSF 160, and/or (6) improving the shopping and/or check-out experience of a customer.

The controller 310 may store received and extracted information in memory 312 of the MCD 110. Accordingly, the memory 312 is connected to and accessible by the controller 310 through electrical connection 332. The memory 312 may be a volatile memory and/or a non-volatile memory. For example, memory 312 can include, but is not limited to, a RAM, a DRAM, a ROM and a flash memory. The memory 312 may also comprise unsecure memory and/or secure memory. The memory 312 can be used to store various other types of data 360 therein, such as authentication information, cryptographic information, location information, and various article-related information.

As shown in FIG. 3, one or more sets of instructions 350 are stored in memory 312. The instructions may include customizable instructions and non-customizable instructions. The instructions 350 can also reside, completely or at least partially, within the controller 310 during execution thereof by MCD 110. In this regard, the memory 312 and the controller 310 can constitute machine-readable media. The term "machine-readable media", as used herein, refers to a single medium or multiple media that stores one or more sets of instructions 350. The term "machine-readable media", as used here, also refers to any medium that is capable of storing, encoding or carrying the set of instructions 350 for execution by the MCD 110 and that causes the MCD 110 to perform one or more of the methodologies of the present disclosure.

The controller 310 is also connected to a user interface 330. The user interface 330 comprises input devices 316, output devices 324 and software routines (not shown in FIG. 3) configured to allow a user to interact with and control software applications (e.g., software applications 352-258 and other software applications) installed on MCD 110. Such input and output devices may include, but are not limited to, a display 328, a speaker 326, a keypad 320, a directional pad (not shown in FIG. 3), a directional knob (not shown in FIG. 3), a microphone 322, and a cameral 318. The display 328 may be designed to accept touch screen inputs. As such, user interface 330 can facilitate a user software interaction for launching applications (e.g., software applications 352-258 and other software applications) installed on MCD 110. The user interface 330 can facilitate a user-software interactive session for: initiating communications with an external device; writing data to and reading data from memory 312; initiating a retail application process for providing a user with improved customer service and/or the retail store with increased security. The retail application process will be described below in detail.

The display 328, keypad 320, directional pad (not shown in FIG. 3) and directional knob (not shown in FIG. 3) can collectively provide a user with a means to initiate one or more software applications or functions of MCD 110. The application software 352-358 can facilitate the data exchange (a) a user and the MCD 110, (b) the MCD 102 and a POS station, and/or (c) the MCD 110 and a beacon (e.g., beacon 138 of FIG. 1). In this regard, the application software 352-358 performs one or more of the following: verify the identity of a user of MCD 110 via an authentication process; present information to the user indicating this his/her identity has or has not been verified; and present a Graphical User Interface ("GUI") to the user for enabling the user to initiate a customer service process for providing the user with improved customer service when the user is in a retail store facility (e.g., RSF 150 of FIG. 1).

The application software 352-358 also performs one or more of the following: transmit a unique identifier to the beacon; receive information from a remotely located database (e.g., promotional materials); and/or display the received information on a display screen of the MCD 110. The application software 352-358 further performs one or more of the following: receive a unique identifier from a beacon; communicate the beacon's unique identifier and its unique identifier to a remotely located SIS; receive information from the SIS; and/or display the received information on a display screen of the MCD 110.

Figure 4:
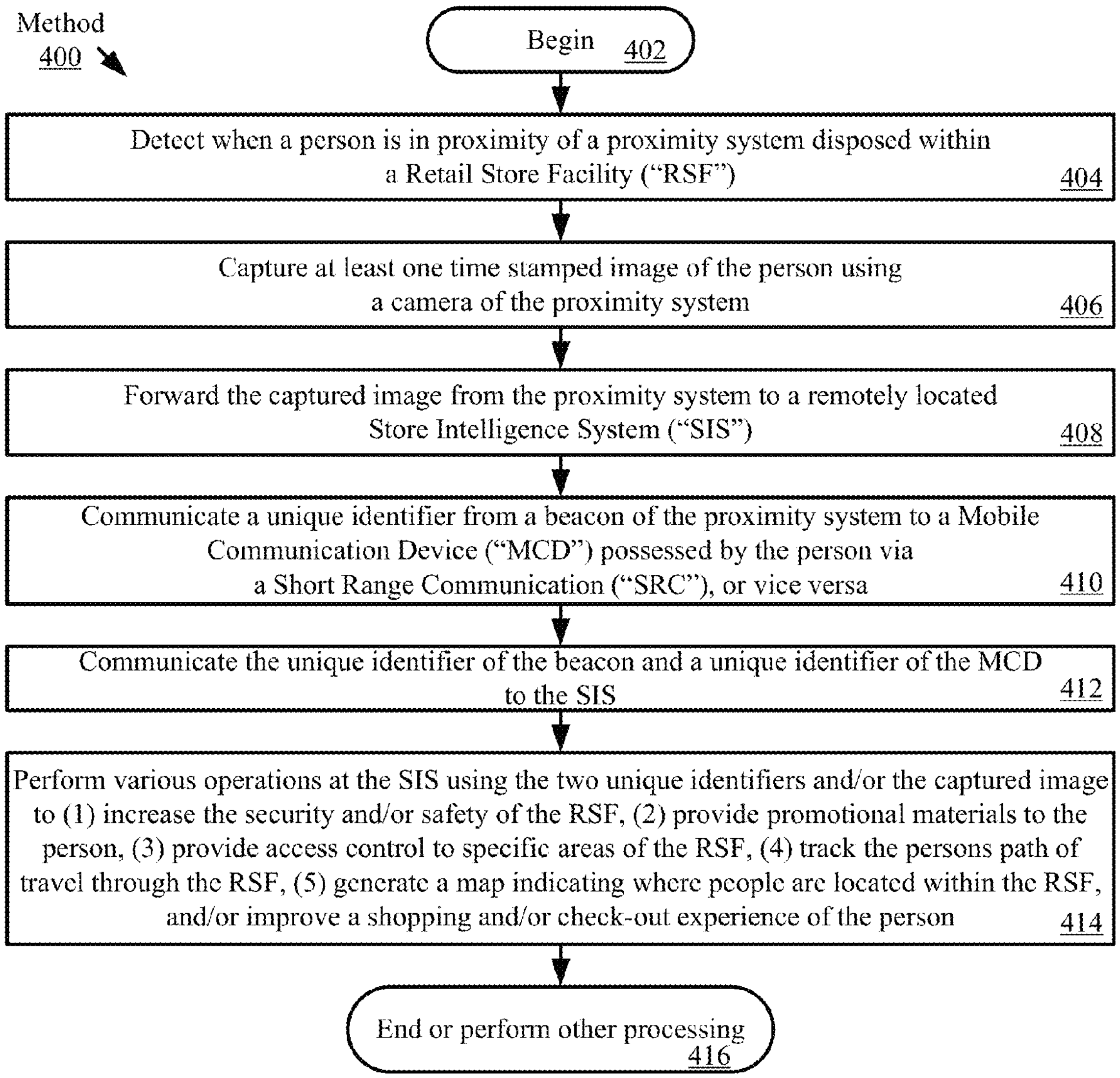
FIG. 4 is a flow diagram of an exemplary method for providing store intelligence.

Referring now to FIG. 4, there is provided a flow diagram of an exemplary method 400 for providing store intelligence. Method 400 begins with step 402 and continues with step 404. Step 404 involves detecting when a person is in proximity of a proximity system (e.g., proximity system 106, 116 or 134 of FIG. 1) disposed within an RSF (e.g., RSF 160 of FIG. 1). Such detection can be made using proximity sensors (e.g., proximity sensors 130 of FIG. 1) disposed adjacent to or near the proximity system. Next in step 406, at least one time stamped image of the person is captured by a camera of the proximity system. The captured image is then communicated from the proximity system to a remotely located SIS (e.g., SIS 140 of FIG. 1), as shown by step 408. A unique identifier is communicated in step 410 from a beacon (e.g., beacon 138 of FIG. 1) of the proximity system to an MCD (e.g., MCD 110 of FIG. 1) possessed by the person via an SRC (e.g., a Bluetooth communication), or vice versa. Unique identifiers of the beacon and MCD are communicated to the SIS in step 412. Various operations are then performed in step 414 by the SIS using the two unique identifiers and/or captured image. These operations are performed to (1) increase the security and/or safety of the RSF, (2) provide promotional materials to the person, (3) provide access control to specific areas of the RSF, (4) track the persons path of travel through the RSF, (5) generate a map indicating where at least the person is located and/or was previously located within the RSF, and/or (6) improve the shopping and/or check-out experience of a customer. Subsequently, step 416 is performed where method 400 ends or other processing is performed.

Figure 5A:
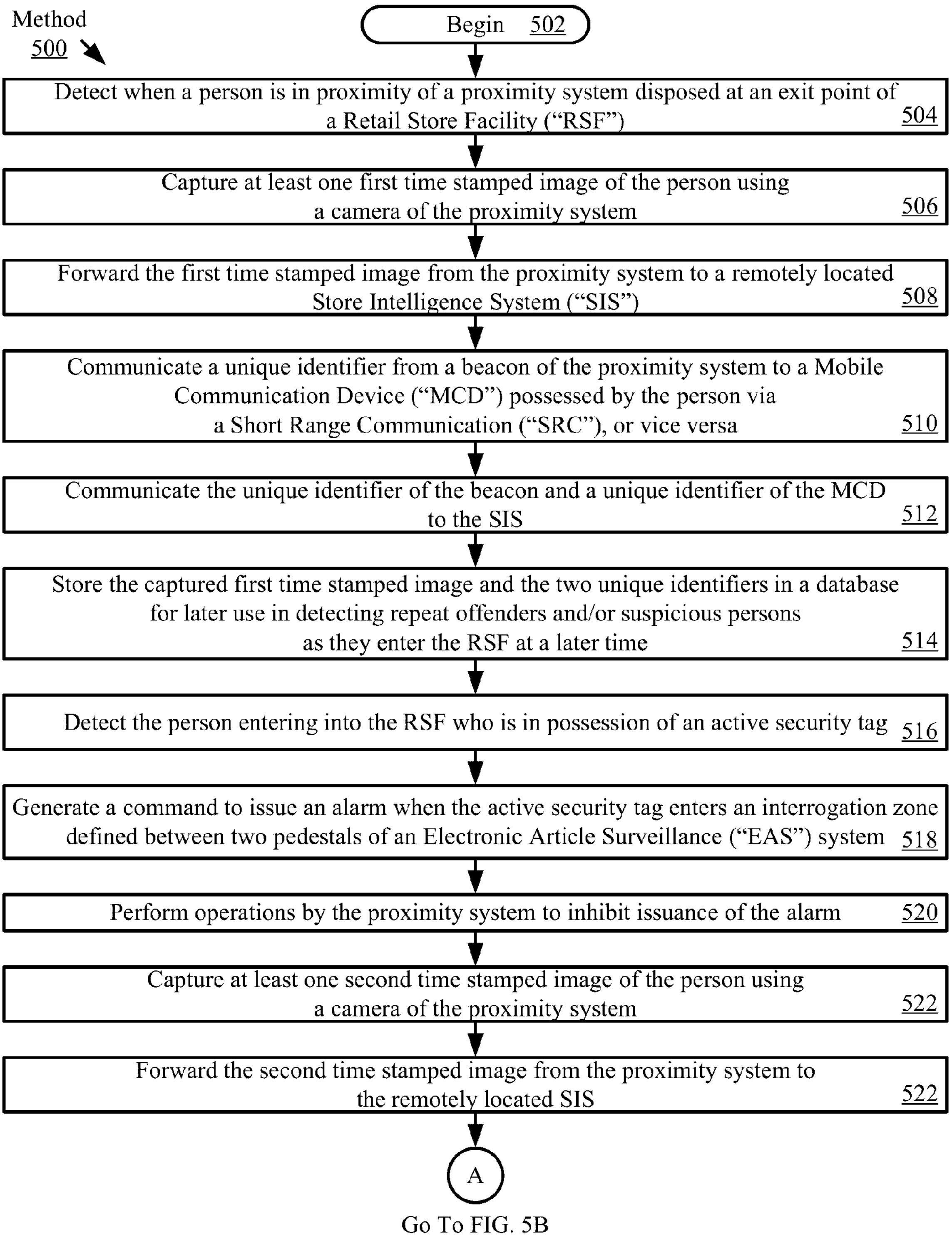
FIGS. 5A-5B collectively provide a flow diagram of another exemplary method for providing store intelligence.
Figure 5B:
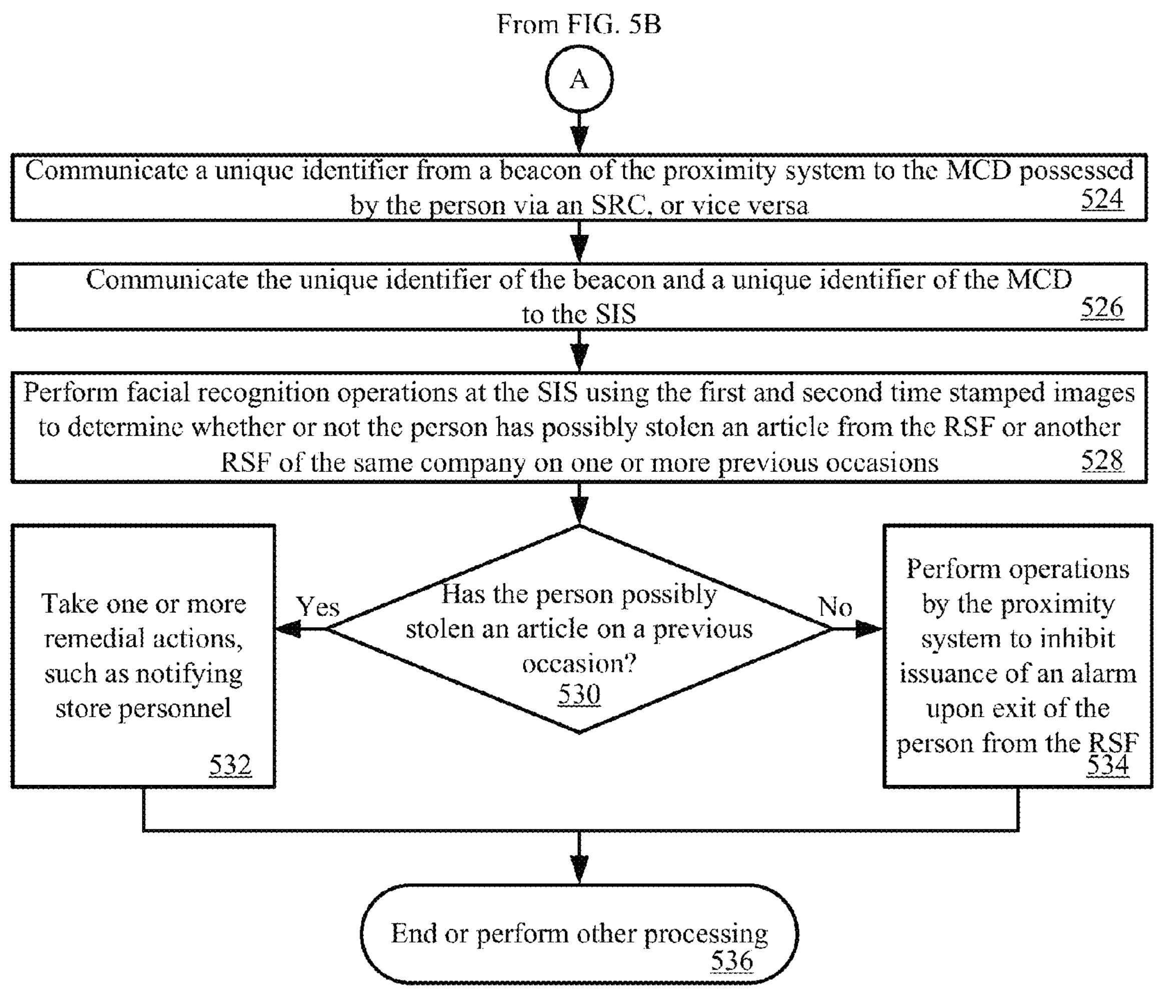

Referring now to FIGS. 5A-5B, there is provided a flow diagram of an exemplary method 500 for providing store intelligence. Method 500 begins with step 502 and continues with step 504. Step 504 involves detecting when a person is in proximity of a proximity system (e.g., proximity system 106, 116 or 134 of FIG. 1) disposed at an exit point of an RSF (e.g., RSF 160 of FIG. 1). Such detection can be made using proximity sensors (e.g., proximity sensors 130 of FIG. 1) disposed adjacent to or near the proximity system. Next in step 506, at least one first time stamped image of the person is captured by a camera of the proximity system. The first captured image is then communicated from the proximity system to a remotely located SIS (e.g., SIS 140 of FIG. 1), as shown by step 508. A unique identifier is communicated in step 510 from a beacon (e.g., beacon 138 of FIG. 1) of the proximity system to an MCD (e.g., MCD 110 of FIG. 1) possessed by the person via an SRC (e.g., a Bluetooth communication), or vice versa. Unique identifiers of the beacon and MCD are communicated to the SIS in step 512. The captured first time stamped image and the two unique identifiers are stored in a database of the SIS for later use in detecting repeat offenders and/or suspicious persons as they enter the RSF at a later time, as shown by step 514.

Subsequently, a detection is made in step 516 that the person is entering into the RSF. The person is in possession of an active security tag. As such, a command is generated in step 518 by an EAS system (e.g., EAS system 120 of FIG. 1) to issue an alarm when the active security tag enters into an interrogation zone defined between two pedestals of the EAS system. Issuance of the alarm is then inhibited by the proximity system, as shown by step 520. Also, at least one second time stamped image of the person is captured in step 522 using the camera of the proximity system. In a next step 524, the second time stamped image is forwarded from the proximity system to the remotely located SIS. Thereafter, the method 500 continues to step 524 of FIG. 5B.

Step 524 involves communicating a unique identifier from the beacon of the proximity system to the MCD via an SRC, or vice versa. The unique identifiers of the beacon and MCD are sent to the SIS in step 526. Next in step 528, facial recognition operations are performed at the SIS using the first and second time stamped images. The facial recognition operations are performed to determine whether or not the person has possibly stolen an article from the RSF or another RSF of the same company one or more previous occasions. If the person has possibly stolen an article on a previous occasion [530:YES], then step 532 is performed where one or more remedial actions are taken, such as notifying store personnel of the persons entrance into the store. In contrast, of the person has not possibly stolen an article on a previous occasion [530:NO], then step 534 is performed where the proximity system inhibits issuance of an alarm upon exit of the person from the RSF. Upon completing step 532 or 534, step 536 is performed where method 500 ends or other processing is performed.

Figure 6:
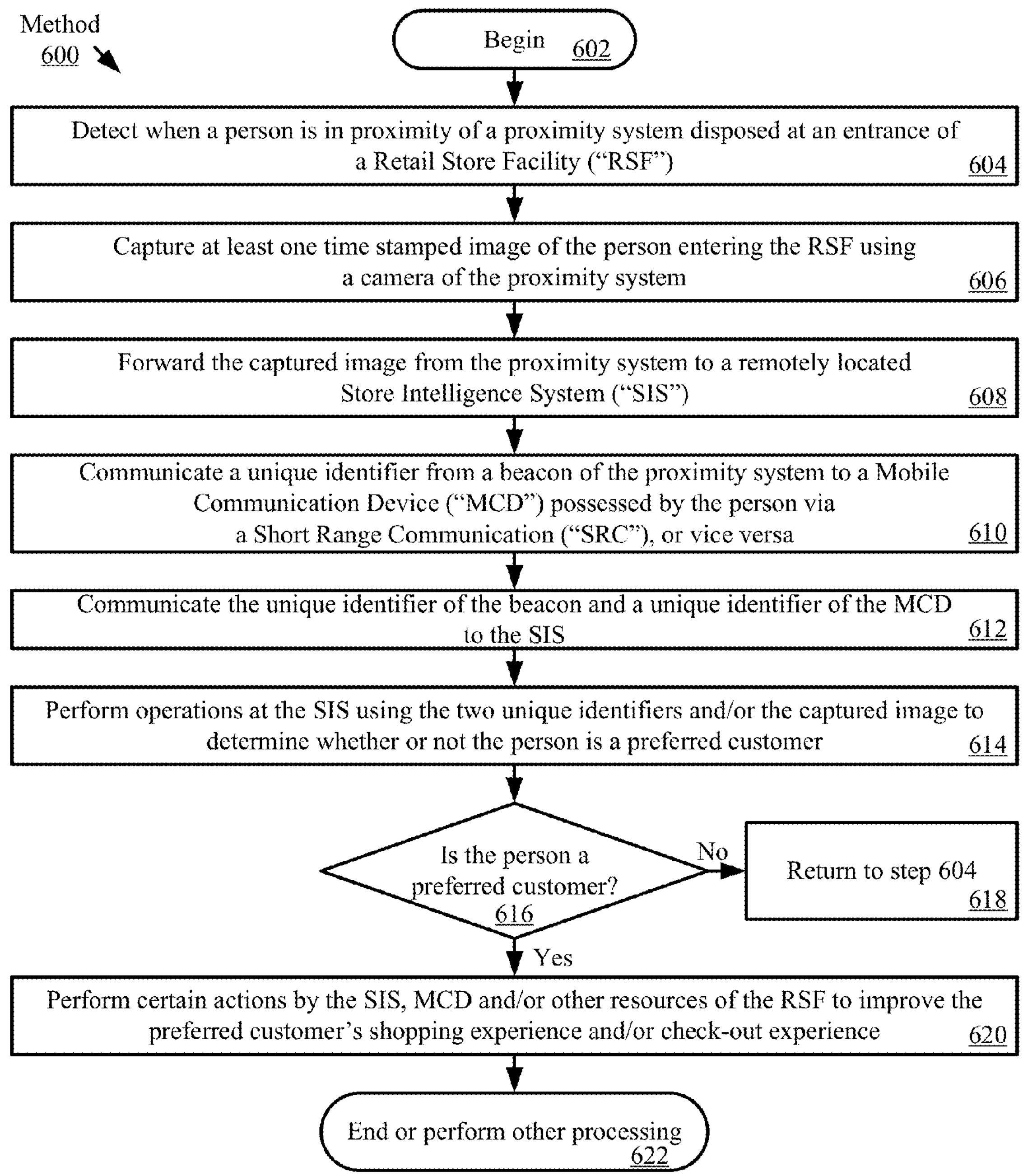
FIG. 6 is a flow diagram of an exemplary method for providing an improved shopping experience to a customer.

Referring now to FIG. 6, there is provided a flow diagram of an exemplary method 600 for providing an improved shopping experience to a customer. Method 600 begins with step 602 and continues with step 604. Step 604 involves detecting when a person is in proximity of a proximity system (e.g., proximity system 106, 116 or 134 of FIG. 1) disposed at an entrance of an RSF (e.g., RSF 160 of FIG. 1). Such detection can be made using proximity sensors (e.g., proximity sensors 130 of FIG. 1) disposed adjacent to or near the proximity system. Next in step 606, at least one time stamped image of the person is captured by a camera of the proximity system. The captured image is then communicated from the proximity system to a remotely located SIS (e.g., SIS 140 of FIG. 1), as shown by step 608. A unique identifier is communicated in step 610 from a beacon (e.g., beacon 138 of FIG. 1) of the proximity system to an MCD (e.g., MCD 110 of FIG. 1) possessed by the person via an SRC (e.g., a Bluetooth communication), or vice versa. Unique identifiers of the beacon and MCD are communicated to the SIS in step 612.

In a next step 614, operations are performed at the SIS to determine whether or not the person is a preferred customer. This determination is made using the two unique identifiers and/or the captured image. If the person is not a preferred customer [616:NO], then step 618 is performed where method 600 returns to step 604. In contrast, if the person is a preferred customer [616:YES], then step 620 is performed. Step 620 involves performing certain actions by the SIS, MCD and/or other resources (e.g., personnel) of the RSF to improve the preferred customer's shopping experience and/or check-out experience. Subsequently, step 622 is performed where method 600 ends or other processing is performed.

Figure 7:
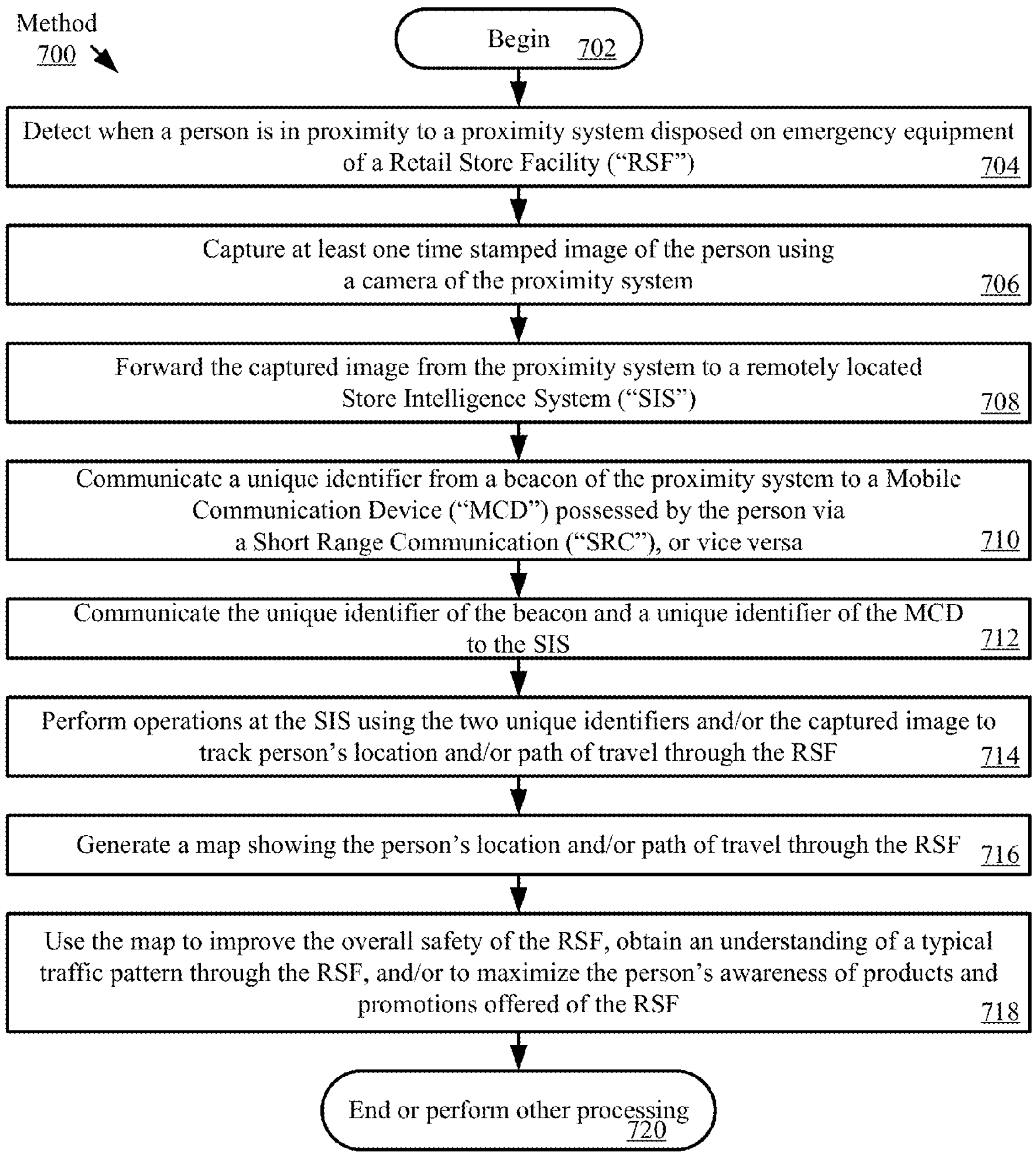
FIG. 7 is a flow diagram of an exemplary method for improving the safety of a facility.

Referring now to FIG. 7, there is provided an exemplary method 700 for improving the safety of a facility. Method 700 begins with step 702 and continues with step 704. Step 704 involves detecting when a person is in proximity of a proximity system (e.g., proximity system 106, 116 or 134 of FIG. 1) disposed at on emergency equipment of an RSF (e.g., RSF 160 of FIG. 1). Such detection can be made using proximity sensors (e.g., proximity sensors 130 of FIG. 1) disposed adjacent to or near the proximity system. Next in step 706, at least one time stamped image of the person is captured by a camera of the proximity system. The captured image is then communicated from the proximity system to a remotely located SIS (e.g., SIS 140 of FIG. 1), as shown by step 708. A unique identifier is communicated in step 710 from a beacon (e.g., beacon 138 of FIG. 1) of the proximity system to an MCD (e.g., MCD 110 of FIG. 1) possessed by the person via an SRC (e.g., a Bluetooth communication), or vice versa. Unique identifiers of the beacon and MCD are communicated to the SIS in step 712.

The SIS performs operations in step 714 to track the person's location and/or path of travel through the RSF. The tracking is achieved using the two unique identifiers and/or the captured image. Next in step 716, a map is generated showing the person's location and/or path of travel through the RSF. The map is used to improve the overall safety of the RSF, as shown by step 718. In other scenarios, the map is used to obtain an understanding of a typical traffic pattern through the RSF and/or to maximize the person's awareness of products and promotions offered by the RSF. Subsequently, step 720 is performed where method 700 ends or other processing is performed.

Figure 8:
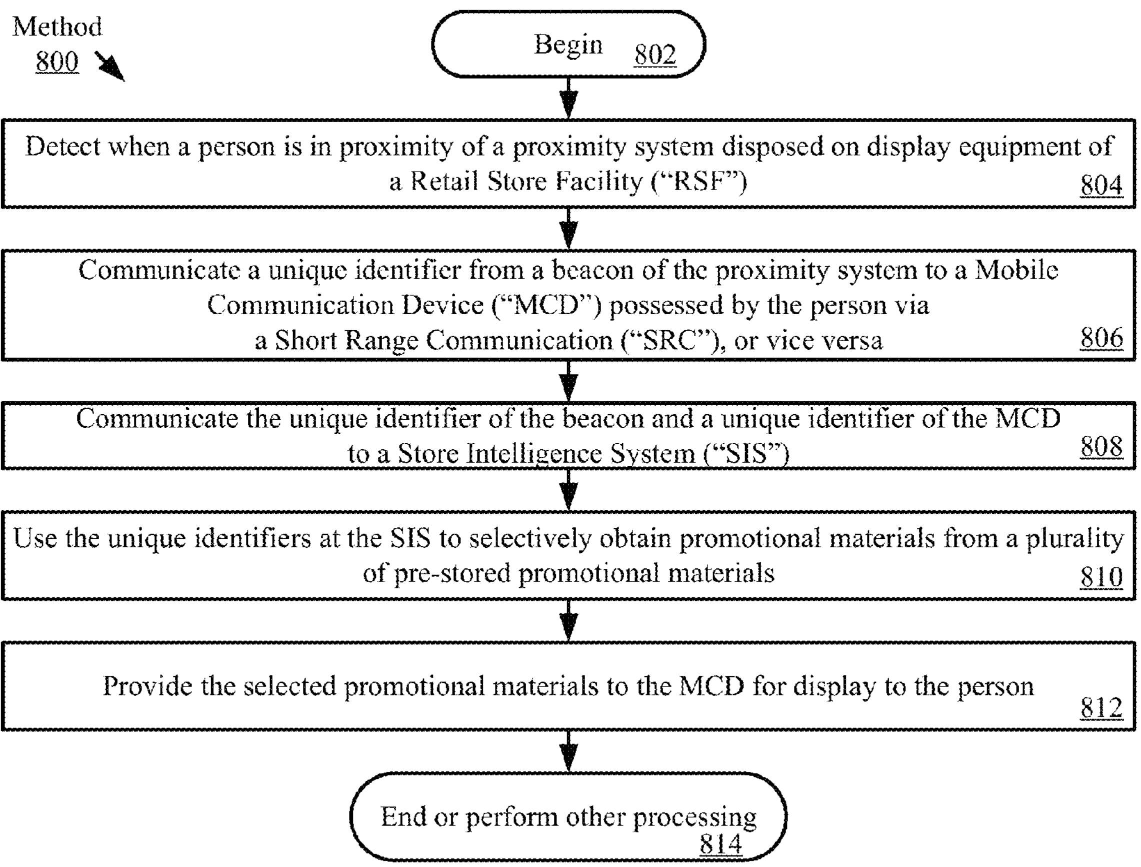
FIG. 8 is a flow diagram of an exemplary method for selectively providing promotional materials to customers.

Referring now to FIG. 8, there is provided a flow diagram of an exemplary method 800 for selectively providing promotional materials to customers. Method 800 begins with step 802 and continues with step 804. Step 804 involves detecting when a person is in proximity of a proximity system (e.g., proximity system 106, 116 or 134 of FIG. 1) disposed on display equipment of an RSF (e.g., RSF 160 of FIG. 1). Such detection can be made using proximity sensors (e.g., proximity sensors 130 of FIG. 1) disposed adjacent to or near the proximity system. Next in step 806, a unique identifier is communicated from a beacon (e.g., beacon 138 of FIG. 1) of the proximity system to an MCD (e.g., MCD 110 of FIG. 1) possessed by the person via an SRC (e.g., a Bluetooth communication), or vice versa. Unique identifiers of the beacon and MCD are communicated to the SIS in step 808. The unique identifiers are then used in step 810 at the SIS to selectively obtain promotional materials from a plurality of pre-stored promotional materials. The selected promotional materials are provided to the MCD for display to the person, as shown by step 812. Subsequently, step 814 is performed where method 800 ends or other processing is performed.

Figure 9A:
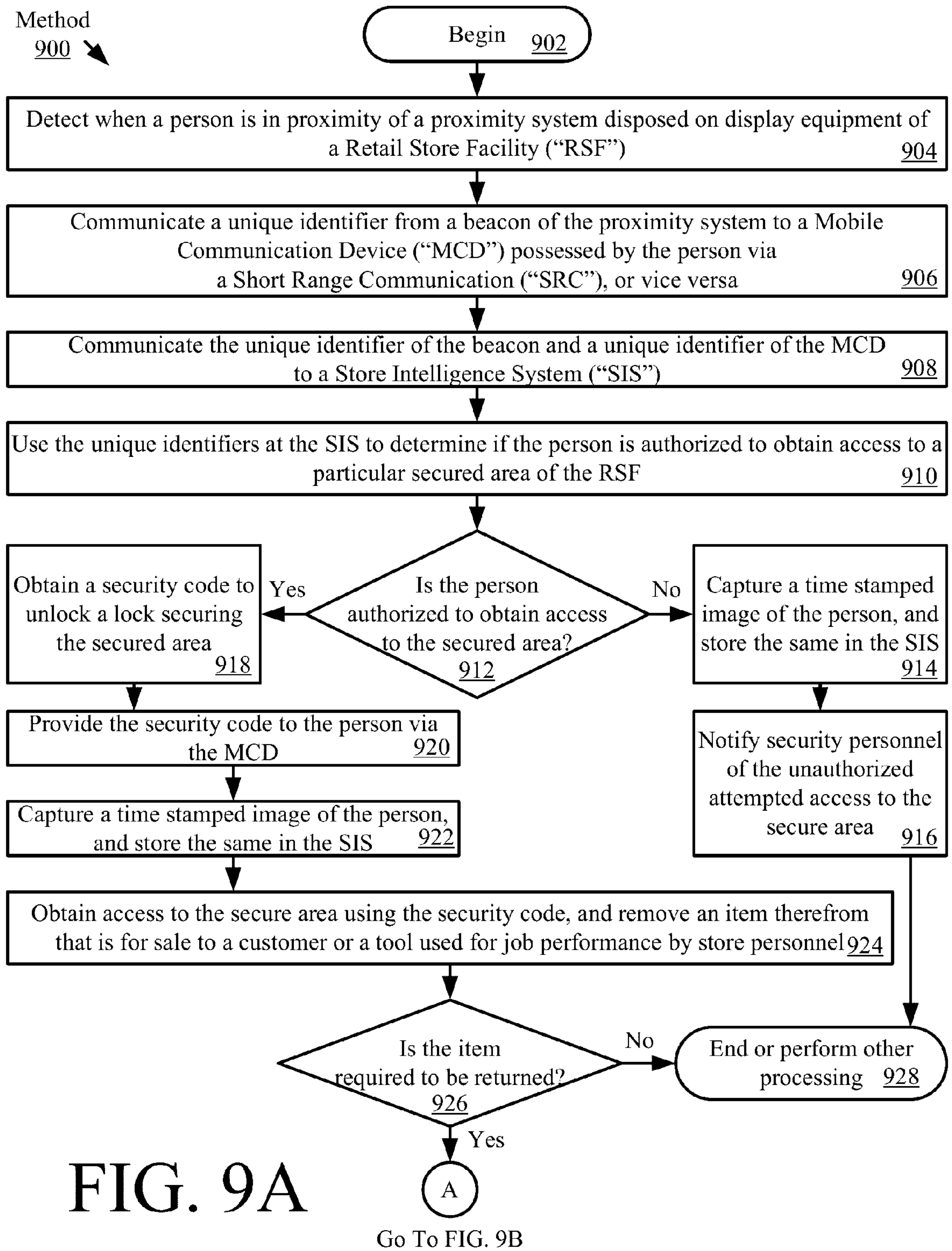
FIGS. 9A-9B provide a flow diagram of an exemplary method for controlling access to secure areas of a facility.
Figure 9B:
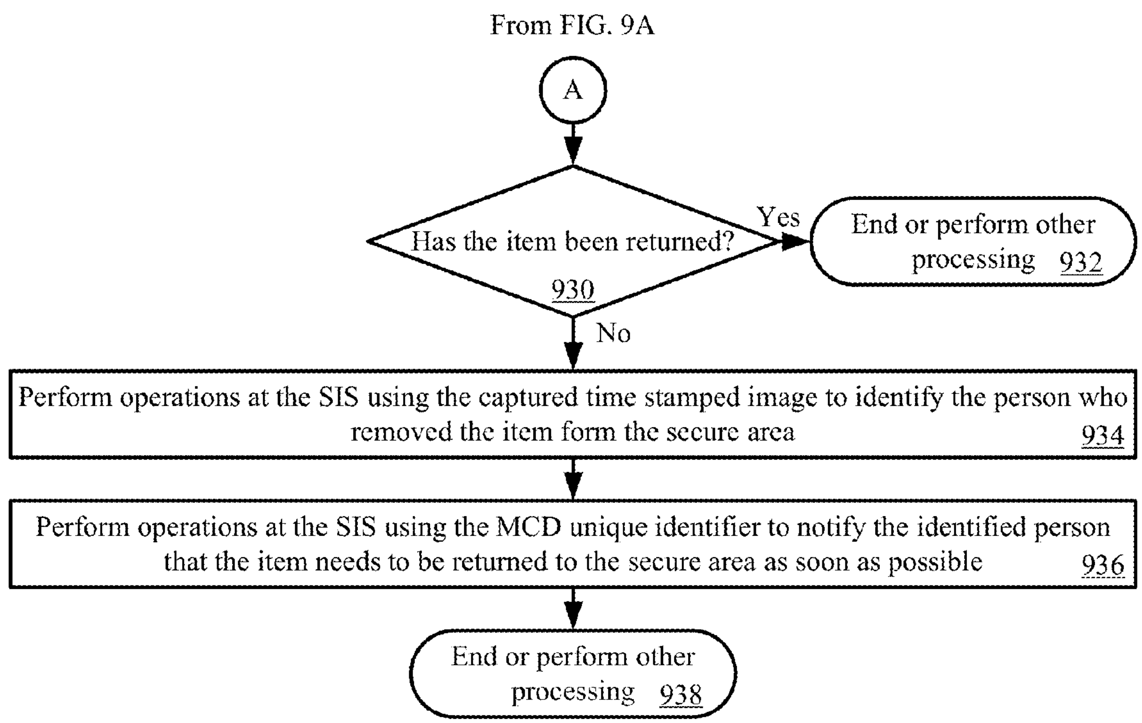

Referring now to FIGS. 9A-9B, there is provided a flow diagram of an exemplary method 900 for controlling access to secure areas of a facility. Method 900 begins with step 902 and continues with step 904. Step 904 involves detecting when a person is in proximity of a proximity system (e.g., proximity system 106, 116 or 134 of FIG. 1) disposed on display equipment of an RSF (e.g., RSF 160 of FIG. 1). Such detection can be made using proximity sensors (e.g., proximity sensors 130 of FIG. 1) disposed adjacent to or near the proximity system. Next in step 906, a unique identifier is communicated from a beacon (e.g., beacon 138 of FIG. 1) of the proximity system to an MCD (e.g., MCD 110 of FIG. 1) possessed by the person via an SRC (e.g., a Bluetooth communication), or vice versa. Unique identifiers of the beacon and MCD are communicated to the SIS in step 908.

The unique identifiers are used in step 910 at the SIS to determine if the person is authorized to obtain access to a particular secured area of the RSF. If the person is not authorized to obtain access to the particular secured area [912:NO], then a time stamped image of the person is captured in step 914. The captured image is stored in the SIS. Next, security personnel are notified of the unauthorized attempt to access the secure area, as shown by step 916. Subsequently, step 928 is performed where method 900 ends or other processing is performed.

If the person is authorized to obtain access to the particular secured area [912:YES], then step 918 is performed where a security code is obtained to unlock a lock securing the secured area. The security code is provided to the person via the MCD in step 920. Next, a time stamped image of the person is captured and stored in the SIS, as shown by step 922. The person then obtains access to the secured area using the security code and removes an item therefrom, as shown by step 924. The item can include, but is not limited to, an article for sale to a customer or a tool used for job performance by store personnel.

Next a decision step 926 is performed to determine whether or not the item needs to be returned to the secured area. If the item is not required to be returned [926:NO], then step 928 is performed where method 900 ends or other processing is performed. In contrast, if the item is required to be returned [926:YES], then method 900 continues with decision step 930 of FIG. 9B.

Step 930 involves determining of the item has been returned. If the item has been returned [930:YES], then step 932 is performed where method 900 ends or other processing is performed. In contrast, if the item has not been returned [930:NO], then step 934 is performed where the SIS uses the captured image to identify the person who removed the item from the secured area. The person is then notified in step 936 that the item needs to be returned as soon as possible. Subsequently, step 938 is performed where method 900 ends or other processing is performed.

Figure 10:
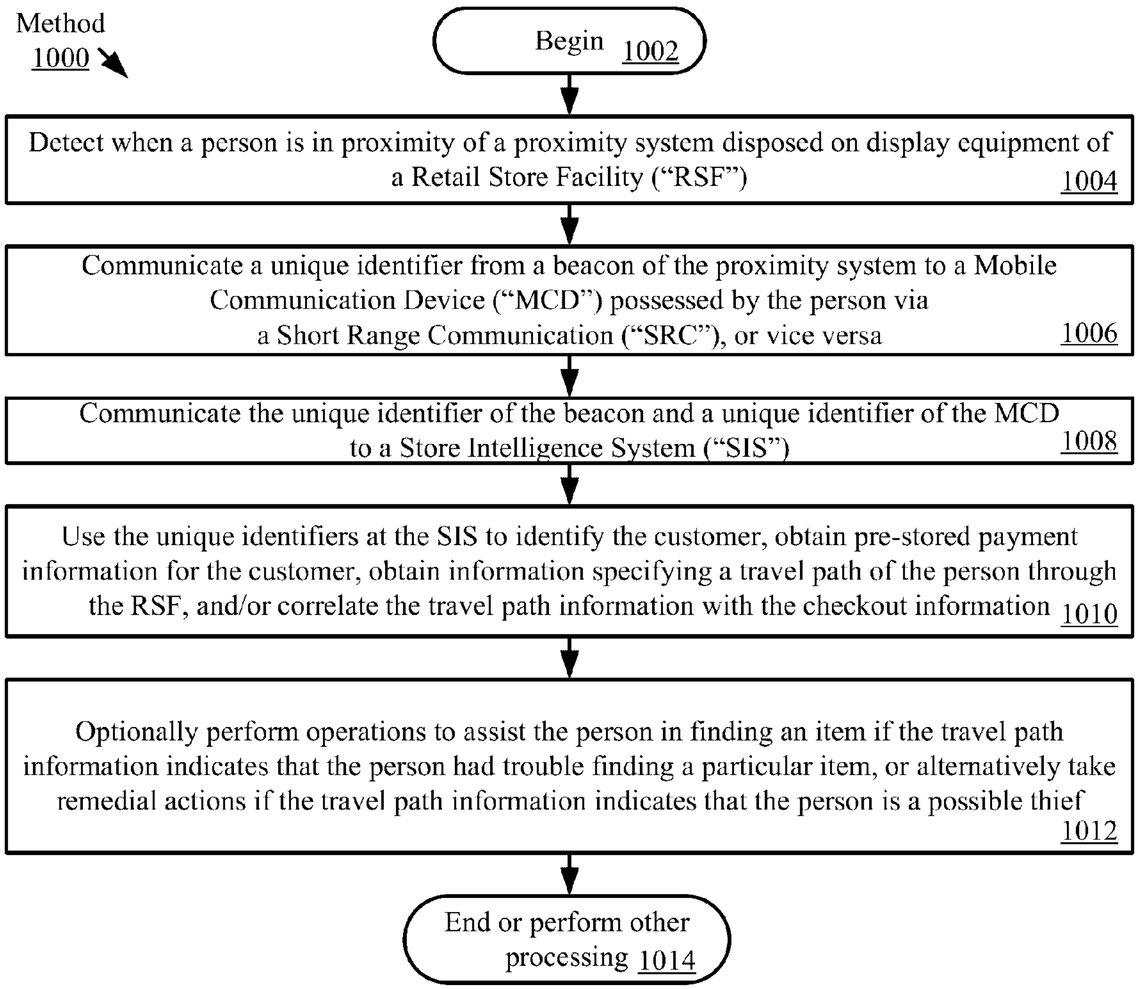
FIG. 10 is a flow diagram of an exemplary method for improving a check-out process of a customer.

Referring now to FIG. 10, there is provided a flow diagram of an exemplary method 1000 for improving a check-out process of a customer. Method 1000 begins with step 1002 and continues with step 1004. Step 1004 involves detecting when a person is in proximity of a proximity system (e.g., proximity system 106, 116 or 134 of FIG. 1) disposed on display equipment of an RSF (e.g., RSF 160 of FIG. 1). Such detection can be made using proximity sensors (e.g., proximity sensors 130 of FIG. 1) disposed adjacent to or near the proximity system. Next in step 1006, a unique identifier is communicated from a beacon (e.g., beacon 138 of FIG. 1) of the proximity system to an MCD (e.g., MCD 110 of FIG. 1) possessed by the person via an SRC (e.g., a Bluetooth communication), or vice versa. Unique identifiers of the beacon and MCD are communicated to the SIS in step 1008.

The unique identifiers are used in step 1010 by the SIS to identify the customer, obtain pre-stored payment information for the customer, obtain information specifying a travel path of the person through the RSF, and/or correlate travel path information with the checkout information. Optional operations can also be performed in step 1012 to assist the person in finding an item of the travel path information indicates that the person had trouble finding a particular item, or alternatively take remedial actions if the travel path information indicates that the person is a possible thief. Subsequently, step 1014 is performed where method 1000 ends or other processing is performed.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. A method for providing store intelligence, comprising:

communicating a first unique identifier between a first beacon of a first proximity system disposed adjacent to an Electronic Article Surveillance ("EAS") system of a first facility and a Mobile Communication Device ("MCD") possessed by a person located in proximity to the first beacon via a first Short Range Communication ("SRC");

communicating the first unique identifier and a second unique identifier to an intelligence system located remote from the first beacon and the MCD, where the first and second unique identifiers collectively comprise a unique identifier of the first beacon and a unique identifier of the MCD;

capturing a first time stamped image of the person using a camera of the proximity system which is located near the first beacon;

communicating the first time stamped image to the intelligence system for storage;

performing operations at the intelligence system to enhance the security or safety of the first facility by (1) using the first unique identifier to detect an entrance or exit of the person to/from the first facility, (2) using at least one of the second unique identifier and the first time stamped image to make a first determination as to an identification of the person, or (3) using at least the first time stamped image to make a second determination as to whether the person possibly stole an article from the first facility or a second facility with a specified degree of confidence; and inhibiting an issuance of an alarm by the EAS system in response to a detection that the person is exiting the first facility with the article and a determination that the person did not steal the article from the first or second facility with the specified degree of confidence.

2. The method according to claim 1, wherein communication of the first unique identifier is performed in response to a detection of when the person moves in proximity to the first beacon.

3. The method according to claim 1, wherein the capturing is triggered because (1) a people counter in or near a pedestal of the EAS system is activated or (2) a proximity sensor detects the presence of the person in proximity to the pedestal.

4. The method according to claim 1, further comprising:

issuing an alarm when the person entering the first facility comprises an active security tag and moves into an interrogation zone of the EAS system; and performing operations by the proximity system to inhibit issuance of the alarm.

5. The method according to claim 1, wherein the second determination is made by comparing the first time stamped image to a plurality of second time stamped images captured as people exited the first or second facility during a previous period of time when a theft actually or is thought to have occurred.

6. The method according to claim 1, further comprising performing operations by the intelligence system to notify security personnel when it is determined that the person possibly stole the article from the first facility or second facility.

7. The method according to claim 1, further comprising performing operations by the intelligence system to provide the first time stamped image to the security personnel when it is determined that the person possibly stole the article from the first facility or second facility.

8. The method according to claim 1, further comprising:

communicating the second unique identifier or a third unique identifier between a second beacon of a second proximity system disposed adjacent to emergency equipment of the first facility and the MCD possessed by the person located in proximity to the second beacon via a second SRC;

communicating the second unique identifier and the third unique identifier to the intelligence system, where the second and third unique identifiers collectively comprise a unique identifier of the second beacon and the unique identifier of the MCD; and using at least the second and third unique identifiers by the intelligence system to provide information specifying at least a current location of the person within the first facility to emergency personnel.

9. A system, comprising:

an Electronic Article Surveillance ("EAS") system;

a first beacon disposed adjacent to the EAS system and communicating with a Mobile Communication Device ("MCD") possessed by a person located in proximity to the first beacon via a first Short Range Communication ("SRC") so as to send a first unique identifier uniquely identifying the first beacon or receive a second unique identifier uniquely identifying the MCD;

a camera capturing a first time stamped image of the person located in proximity to the first beacon; and an intelligence system located remote from the first beacon and the MCD, and enhancing the security or safety of a first facility by (1) using the first unique identifier to detect an entrance or exit of the person to/from the first facility, (2) using at least one of the second unique identifier and the first time stamped image to make a first determination as to an identification of the person, or (3) using at least the first time stamped image to make a second determination as to whether the person possibly stole an article from the first facility or a second facility with a specified degree of confidence; and inhibiting an issuance of an alarm by the EAS system in response to a detection that the person is exiting the first facility and a determination that the person did not steal the article from the first or second facility with the specified degree of confidence.

10. The system according to claim 9, wherein communication of the first or second unique identifier is performed in response to a detection of when the person moves in proximity to the first beacon.

11. The system according to claim 9, wherein the capturing is triggered because (1) a people counter in or near a pedestal of the EAS system is activated or (2) a proximity sensor detects the presence of the person in proximity to the pedestal.

12. The system according to claim 9, wherein the EAS system issues an alarm when the person entering the first facility comprises an active security tag and moves into an interrogation zone of the EAS system, and the proximity system subsequently performs operations to inhibit issuance of the alarm.

13. The system according to claim 9, wherein the second determination is made by comparing the first time stamped image to a plurality of second time stamped images captured as people exited the first or second facility during a previous period of time when a theft actually or is thought to have occurred.

14. The system according to claim 9, wherein the intelligence system notifies security personnel when it is determined that the person possibly stole the article from the first facility or second facility.

15. The system according to claim 9, wherein the intelligence system provides the first time stamped image to the security personnel when it is determined that the person possibly stole the article from the first facility or second facility.

16. The system according to claim 9, wherein the second unique identifier or a third unique identifier is communicated between a second beacon of a second proximity system disposed adjacent to emergency equipment of the first facility and the MCD possessed by the person located in proximity to the second beacon via a second SRC, where the third unique identifier uniquely identifying the second beacon, the second unique identifier and the third unique identifier are communicated to the intelligence system, and at least the second and third unique identifiers are used by the intelligence system to provide information specifying at least a current location of the person within the first facility to emergency personnel.

* * * * *